United States Patent [19]

Wissmann et al.

[11] Patent Number: 5,197,418
[45] Date of Patent: Mar. 30, 1993

[54] FUEL INJECTION PUMP FOR A TWO-STROKE ENGINE

[75] Inventors: Michael Wissmann, Mettmann; Hans Nickel, Cottenweiler; Ralf Tuckermann, Stuttgart; Werner Geyer, Waiblingen, all of Fed. Rep. of Germany

[73] Assignee: Andreas Stihl, Waiblingen, Fed. Rep. of Germany

[21] Appl. No.: 940,995

[22] Filed: Sep. 4, 1992

[30] Foreign Application Priority Data

Sep. 6, 1991 [DE] Fed. Rep. of Germany ....... 4129574

[51] Int. Cl.$^5$ .............................................. F04B 43/06
[52] U.S. Cl. .............................. 123/73 C; 123/179.14; 123/504; 417/214
[58] Field of Search ............ 123/504, 179.17, 73 AD, 123/73 A, 73 B, 73 C, 495; 417/214, 384, 395

[56] References Cited

U.S. PATENT DOCUMENTS

| | | | |
|---|---|---|---|
| 2,935,057 | 5/1960 | Perlewitz | 123/73 AD |
| 3,653,784 | 4/1972 | Leitermann et al. | 123/73 AD |
| 4,473,340 | 9/1984 | Walsworth | 123/73 AD |
| 4,700,668 | 10/1987 | Schierling et al. | 123/73 C |
| 4,807,573 | 2/1989 | Schierling et al. | 123/73 C |
| 4,846,119 | 7/1989 | Geyer et al. | 123/73 C |
| 4,932,370 | 6/1990 | Schlerling et al. | 123/73 AD |

FOREIGN PATENT DOCUMENTS 0133178 2/1985 European Pat. Off. .......... 123/73 C
3521348 12/1986 Fed. Rep. of Germany .

*Primary Examiner*—David A. Okonsky
*Attorney, Agent, or Firm*—Walter Ottesen

[57] ABSTRACT

The invention is directed to a fuel injection pump for a two-stroke engine which is especially for portable handheld tools such as motor-driven chain saws or the like. A pneumatic drive chamber is provided in the pump housing which is partitioned by a membrane into a pulse chamber charged by the crankcase pressure and a return chamber. A membrane plate holds the membrane and charges a pump piston which plunges into a pump cylinder for injecting fuel when a pulse is present in the pulse chamber. The pump piston draws fuel in by suction during a return stroke of the membrane plate into a start position determined by a stop. The stop is configured so as to be displaceable in the direction of the stroke of the piston in dependence upon temperature in order to obtain an adaptation of the injected quantity of fuel to the operating temperature of the engine. In this way, the stroke of the pump piston can be varied and therefore also the quantity of fuel supplied by the pump.

21 Claims, 4 Drawing Sheets

FUEL INJECTION PUMP FOR A TWO-STROKE ENGINE

BACKGROUND OF THE INVENTION

Injection pumps for a two-stroke engine in a work apparatus utilize the crankcase pressure as a drive. With the downward movement of the piston in the direction of bottom dead center, an overpressure is built up in the crankcase while, for a subsequent upward movement of the piston, the crankcase pressure drops to an underpressure. With pending overpressure in the pulse chamber, the pump piston plunges into the pump chamber by means of the membrane plate whereby fuel is injected into the combustion chamber of the two-stroke engine. With pending underpressure, the pump piston moves under the action of the spring into its start position determined by the stop. The pump piston stroke carried out in this manner is directly proportional to the injected fuel quantity.

It is known to make a greatly enriched mixture available in the combustion chamber when the engine is cold which is then leaned to an optimal mixture after the warm-up phase of the engine.

SUMMARY OF THE INVENTION

It is an object of the invention to provide a fuel injection pump which is so improved that the injected fuel quantity is reliably adapted to the operating temperature of the internal combustion engine in a simple manner.

The fuel injection pump of the invention is for a two-stroke engine, especially for handheld portable tools such as motor-driven saws or the like. The engine has a piston and a cylinder conjointly defining a combustion chamber and a crankcase wherein pressure is developed in response to the movement of the piston. The fuel injection pump includes: a housing defining an enclosed work space; a membrane partitioning the work space into a pulse chamber and a return chamber; a spring mounted in the return chamber for applying a resilient biasing force to the membrane to bias the membrane into a rest position; a pump chamber arranged in the housing; fuel supply means connected to the pump chamber for supplying fuel to the latter; fuel metering line means for conducting the fuel from the pump chamber to the engine; a pump cylinder defining a longitudinal axis and communicating with the pump chamber; a pump piston connected to the membrane and being slideably mounted in the cylinder so as to be reciprocally movable through a piston stroke along the axis away from a start position corresponding to the rest position of the membrane and back to the start position; a connecting line connecting the pulse chamber to the crankcase for charging the pulse chamber with the pressure present in the crankcase for actuating the membrane to develop an actuating force against the biasing force of the spring for driving the pump piston into the pump chamber to pump the fuel therein through the fuel metering line means and for then charging the pulse chamber with an underpressure for withdrawing the pump piston away from the pump chamber to draw in a fresh quantity of fuel into the pump chamber from the fuel supply means; and, stop means for determining the start position of the piston; and, displacing means for displacing the stop means along the axis in dependence upon temperature thereby adjusting the length of the stroke and the amount of fuel drawn into the pump chamber.

The return stroke of the pump piston is adjusted in dependence upon the temperature by means of the temperature-dependent displacement of the stop in the stroke direction of the pump piston whereby the fuel quantity drawn in by suction with the return stroke is varied in dependence upon temperature. In this way, the stop is displaced in dependence upon temperature in such a manner that the return stroke of the pump piston is reduced in the warm-up phase with increasing operating temperature and, in this way, the fuel quantity is reduced.

Preferably, the stop is formed by a strip made of bimetal or a memory metal which is fixedly held in the housing at least at one end thereof. The bimetal experiences a position change proportional to the temperature whereas a memory metal assumes a first position below a limit value and assumes a second position above the limit value in a jump-like manner. The metal strip is held tightly at both ends in the housing with its middle segment defining the stop. It is here advantageous that the metal strip is displaceable axially with respect to the longitudinal center axis of the pump piston in both directions with the displacement path being preferably delimited in both directions by respective counter stops. The metal strip configured in this manner is mounted in the pulse chamber where it is flushed by the gases of the crankcase supplied for the drive whereby the thermal coupling between the engine and the metal strip is obtained in a simple manner. With the start of the engine, the gases supplied to the pulse chamber first have ambient temperature and, for this reason, the metal strip remains in its rest position in which the mixture made available in the combustion chamber is enriched. With increasing operating temperature, the crankcase gases also become warmer whereby the metal strip is displaced in a direction toward a stop in a sudden manner (memory metal) or proportionally (bimetal) while reducing the stroke of the pump piston.

This configuration ensures also an intense enrichment of the mixture for a start at negative temperatures especially in an embodiment having the bimetal strip. This takes place because the stop can be displaced in the direction toward the housing while increasing the stroke of the pump piston.

The leaf spring provided as the spring is supported at its ends in supports which are held in a common carrier. In this way, the temperature-dependent control of the pump piston stroke is decoupled from other influences. The supporting forces taken up in the supports are then directed into the common carrier and must therefore not be taken up by the housing. Changes in length of the housing because of temperature differences have therefore no influence on the support of the leaf spring.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
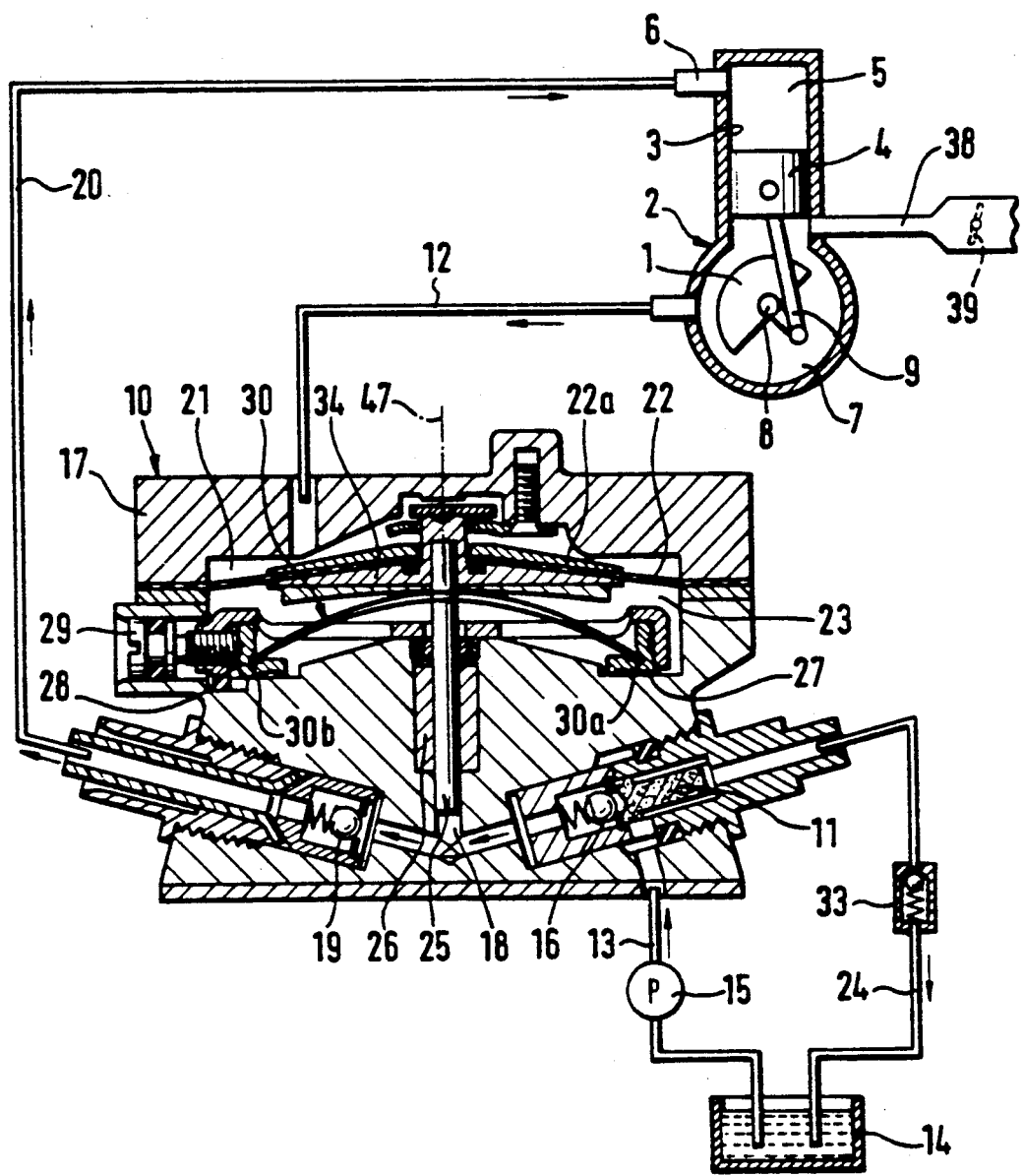
FIG. 1 is a schematic of an injection arrangement having an injection pump according to the invention.
Figure 2:
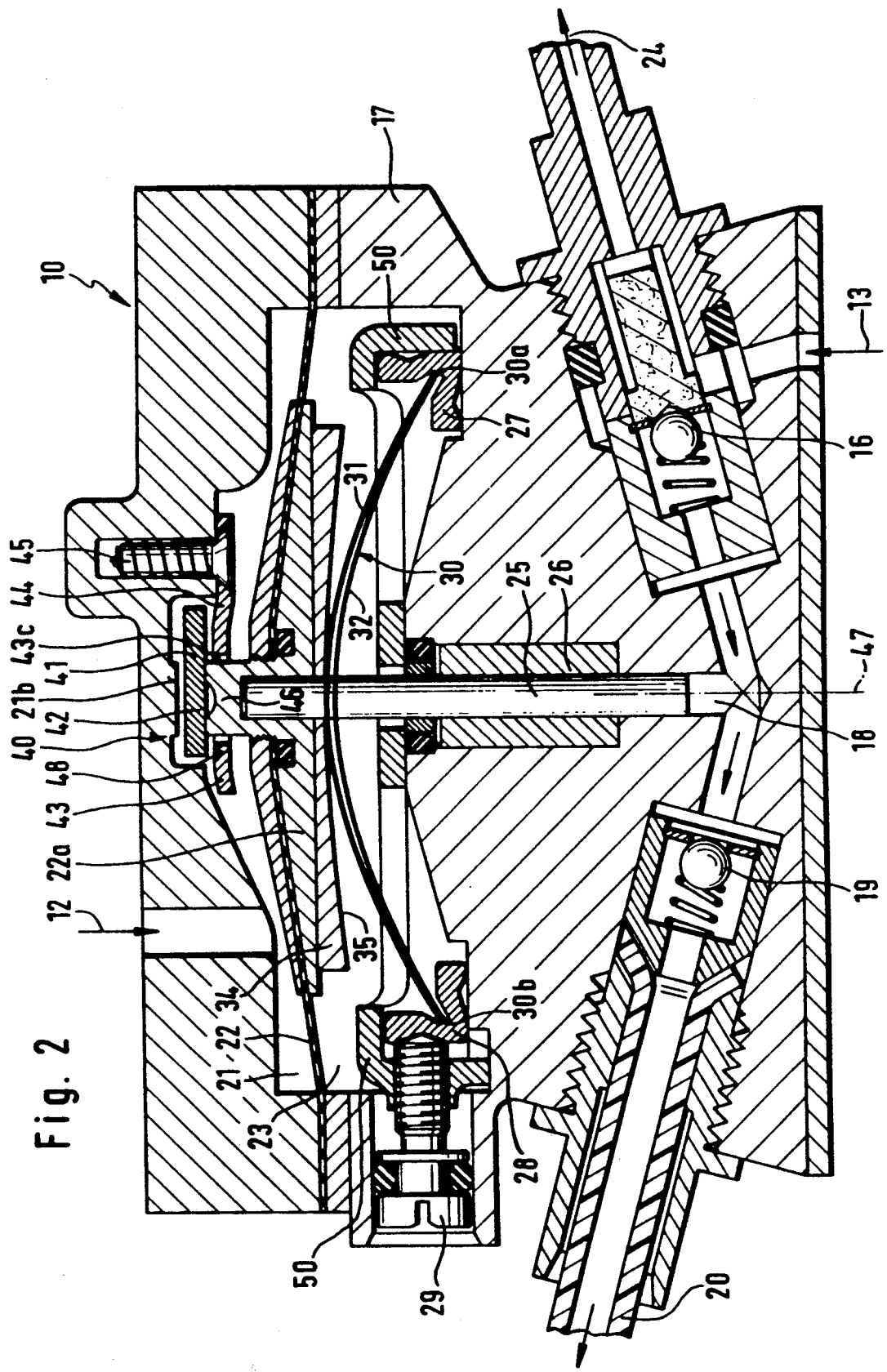
FIG. 2 is an enlarged section view taken through an injection pump according to the invention.

The injection pump shown in FIGS. 1 and 2 is provided for a two-stroke engine 2 especially in a portable handheld work apparatus such as a motor-driven chain saw or the like. The engine includes a cylinder 3, a piston 4, a combustion chamber 5, an injection nozzle 6, a crankcase 7 as well as a crankshaft 8 having a crank flange 1 and a connecting rod 9 for the piston 4. In addition, and as shown in FIG. 1, an intake pipe 38 is provided for the combustion air. The intake pipe 38 communicates with the crankcase 7. The quantity of inflowing combustion air is determined by the position of a throttle flap 39 mounted in the intake pipe 38.

With the downward movement of the piston 4, the pressure in the crankcase 7 increases to produce an overpressure and then drops with the upward movement of the piston 4 until an underpressure is produced. The drive of an injection pump 10 is connected to the crankcase 7 via a pressure line 12. Fuel is supplied via a feed pump 15 and a fuel line 13 to the intake valve 16 of the injection pump 10 forward of the fuel filter 11. The intake valve 16 is configured as a check valve and the fuel is pumped by the feed pump 15 from a tank 14. The fuel is directed back into the tank 14 via a pressure-limiting valve 33 and a return line 24. The opening pressure of the pressure-limiting valve 33 is set higher than the opening pressure of the intake valve 16 so that in the case of an intake of the fuel, the fuel can be drawn in without the danger of a formation of vapor bubbles.

The intake valve 16 is mounted at one end of a pump chamber 18 and an outlet valve 19 configured as a check valve is mounted at the other end of this chamber. An injection line 20 leads from the outlet valve 19 to the injection nozzle 6 of the two-stroke engine 2.

The pressure line 12 of the crankcase 7 opens into a pulse chamber 21 of the injection pump 10 which is partitioned by a membrane 22 from an opposite-lying return chamber 23. The pulse chamber 21 and the return chamber 23 define the drive chamber of the injection pump 10 which is preferably cylindrical.

A pump piston 25 is fixedly attached at the center of a membrane plate 22a holding the membrane 22. The pump piston 25 is guided in a pump cylinder 26 in the housing 17 and delimits the pump chamber 18. A spring 30 resiliently biases the membrane 22 and the membrane plate 22a into the upper starting or rest position shown.

The spring 30 is configured as a leaf spring packet and comprises two individual leaf springs 31 and 32. The leaf spring 31 facing toward the membrane plate 22a is configured longer than the leaf spring 32 facing away from the membrane plate 22a. The ends 30a and 30b of the leaf springs 31 and 32 lie in respective common support points defined by supports 27 and 28, respectively. In the embodiment shown, the supports 27 and 28 are configured as respective abutment angles.

The supports are disposed in a common carrier 50 which preferably is configured as a ring-shaped frame so that the supporting forces to be taken up by the supports (27, 28) are directed into the carrier frame 50 and are not taken up by the housing 17 of the injection pump. This is then of special advantage when the housing is made of a material having a high temperature coefficient or when the material becomes soft with increasing temperature and yields under the action of the support forces. Because of the arrangement of the carrier frame, neither temperature-dependent expansions nor material softening which may occur have any effect on the support of the leaf spring and therefore on the stroke of the pump piston. The carrier frame 50 is configured so as to have an L-shape when viewed in section. One leg of the L-shape projects radially inwardly and engages over each of the supports 27 and 28 configured as an angular stop. The supports and the carrier frame are preferably made of steel or a steel alloy.

The support 27 is fixedly disposed in the carrier frame 50 while the other support 28 is displaceable in the longitudinal direction of the leaf springs 31 and 32 radially with respect to the carrier frame 50 and relative to the other support 27. The adjusting screw 29 threadably engages the carrier frame 50 in the radial direction. In this way, the leaf spring 31 can be adjusted in such a manner that the leaf spring is relaxed and applies no return force in the start position of the membrane plate 22a and of the pump piston 25.

With the downward movement of the piston 4, the positive pressure pulse in the crankcase acts via the pressure line 12 on the membrane 22 whereby the pump piston 25 travels into the pump chamber 18 and fuel is injected into the combustion chamber 5 of the two-stroke engine via the outlet valve 19, the injection line 20 and the injection nozzle 6.

The pressure in the crankcase drops down to an underpressure with the upward movement of the piston 4 so that the membrane 22 with the pump piston 25 travels back into its start position (FIG. 1) under the action of the spring 30 and the negative pressure pulse in the pulse chamber 21. With the movement of the pump piston 25, fuel under pressure is drawn into the pump chamber 18 by suction through the intake valve 16.

In the embodiment shown, the longer leaf spring 31 is disposed at an axial distance to the shorter leaf spring 32 (FIG. 2) in the region of the longitudinal center axis 47 of the pump piston 25. With a increasing stroke of the pump piston, the leaf spring 31 is therefore first active and only thereafter the leaf spring 32 whereby a kinked characteristic is provided which is adapted to the air supplied corresponding to the position of the throttle flap.

As can be especially seen in the enlarged section view of FIG. 2, a bearing plate 34 is mounted between the membrane plate 22a and the leaf spring 31 facing the membrane plate. The bearing plate 34 has a bearing surface 35 facing toward the leaf spring packet 30 and is arcuately shaped in the same direction as the leaf spring 31 facing this surface. With an increasing stroke of the pump piston, the leaf spring 31 facing the bearing surface 35 lies against the bearing plate 35 over a segment of the spring which increases in length whereby, with increasing stroke of the pump piston, a stiffening of the spring 31 results. In this way, the characteristic of the leaf spring can be influenced already in the lower load range.

Figure 3:
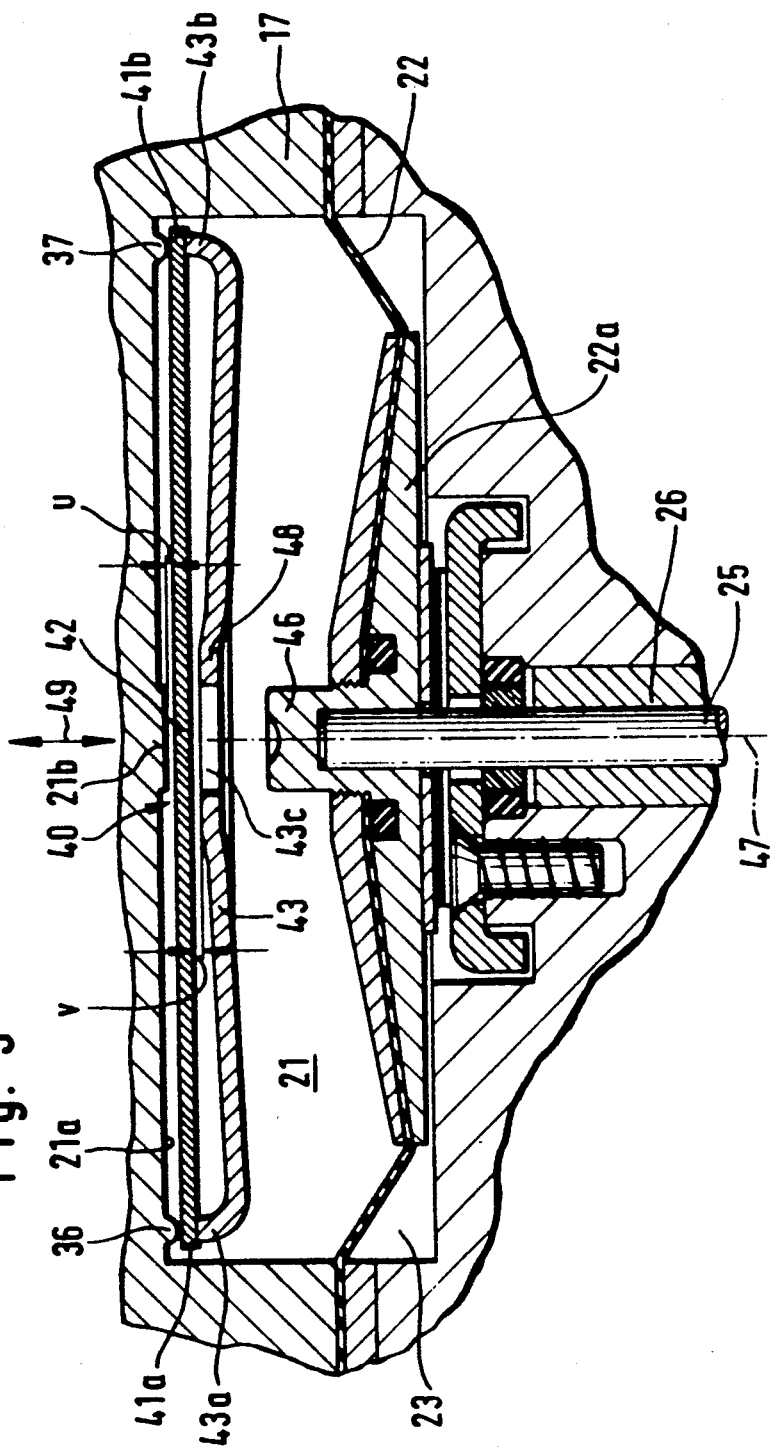
FIG. 3 is a partial view, in section, of the injection pump showing the drive unit of the pump; and, FIG. 4 is a partial view, in section, of an embodiment of the invention wherein the stop means and displacing means are conjointly defined by an expansion element having a housing filled with a material that expands in dependence upon temperature.

The start position of the membrane plate 22a and therefore of the pump piston 25 is determined by a stop 40 as shown in FIGS. 2 and 3. This stop 40 is defined by a segment 42 of a metal strip 41 which is fixedly mounted with respect to the housing at at least one of the two ends (41a, 41b). In the embodiment shown, the metal strip 41 is a bimetal strip which preferably is clamped at both ends (41a, 41b) with the bimetal strip 41 crossing the longitudinal axis of the pump piston in radial direction. The middle segment 42 defining the stop is then disposed so as to lie opposite one end of the pump piston 25.

A memory metal strip can be used in lieu of the bimetal strip. The stop 40 can basically be defined also by an element incorporating a wax expansion material. The use of a time-controlled stop is also conceivable which displaces the stop after a pregiven time interval has expired. The time can, for example, be determined by a heating device which heats the metal strip.

The bimetal strip 41 is mounted at its ends 41a and 41b on respective supports 36 and 37. The supports 36 and 37 are provided in the form of rises on the inner surface 21a of the pulse chamber 21 with the inner surface 21a lying opposite the membrane plate 22a. The bimetal strip 41 is held on the supports 36 and 37 by means of a clamp 43 which extends essentially over the entire length and width of the bimetal strip. The ends 43a and 43b of the clamp 43 are bent over at approximately right angles in the direction of the supports 36 and 37, respectively, and lie with their respective end faces against the ends 41a and 41b, respectively, of the bimetal strip 41.

As shown in FIG. 2, the clamp 43 has an attachment flange 44 provided on its longitudinal side and is fixed to the housing 17 by a screw 45. The dimensions are so selected that, when the screw 45 is tightened, the attachment flange 44 slightly elastically deforms the clamp 43 so that the ends 43a and 43b of the clamp 43 fix the ends 41a and 41b, respectively, of the bimetal strip 41 against the supports 36 and 37, respectively. The attachment flange 44 is disposed at approximately the middle of the clamp 43.

The clamp 43 includes a window 43c in the region of the mid-segment 42 of the bimetal strip 41. A striker boss 46 of the membrane plate 22a passes through the window 40c to come into contact engagement on the center segment 42 of the bimetal strip 41 defining the stop. The striker boss 46 lies in contact engagement against the segment 42 of the bimetal strip in the start position as shown in FIG. 2.

As shown in FIG. 3, the stop 42 is at a spacing (u) from a raised counter stop 21b on the inner surface 21a of the pulse chamber 21 measured in the direction of the longitudinal axis 47 of the pump piston 25. In the opposite direction, the segment 42 is at a spacing (v) from the center segment 48 of the clamp 43. The center segment 48 is configured as a depression in the clamp 43. The displacement path of the segment 42 is identified by the double arrow 49 and is on the one hand delimited by counter stop 21b of the housing 17 and, on the other hand, by the counter stop 48 of the clamp 43.

The rest position of the bimetal strip 41 shown in FIG. 3 is so dimensioned that, because of the position of the segment 42 defining a stop, a quantity of fuel is drawn in by suction with the return stroke of the pump piston which is sufficient to make the mixture correspondingly rich for the warm-up phase. The bimetal strip 41 mounted in the pulse chamber 21 is continuously flushed by the gases supplied from the crankcase 7 via the pressure line 12. With increasing operating duration of the engine, the gases become hotter and effect a curvature of the bimetal strip 41 whereby the stop 42 is displaced in the direction toward the counter stop 48 of the clamp 43 while reducing the spacing (v) until the bimetal strip 42 lies in contact engagement with this counter stop 48. In this way, the return stroke path of the pump piston 25 is reduced and the injected fuel quantity is reduced. The axial position of the counter stop 48 is so selected that an optimal mixture is made available in the combustion chamber 5 as the engine warms up.

The bimetal strip 41 becomes curved in the direction toward the counter stop 21b under extreme start conditions where temperatures are below 0° C. whereby the return stroke of the pump piston is increased since the segment or stop 42 is displaced in the direction toward the counter stop 21b while reducing the spacing (u). In this way, a mixture enrichment is obtained for the cold start on extremely cold winter days.

As mentioned above, the stop 40 can be defined by an element incorporating a wax expansion material which displaces the stop in dependence upon temperature. Elements of this kind are known per se as disclosed, for example, in German Patent 3,521,348.

Figure 4:
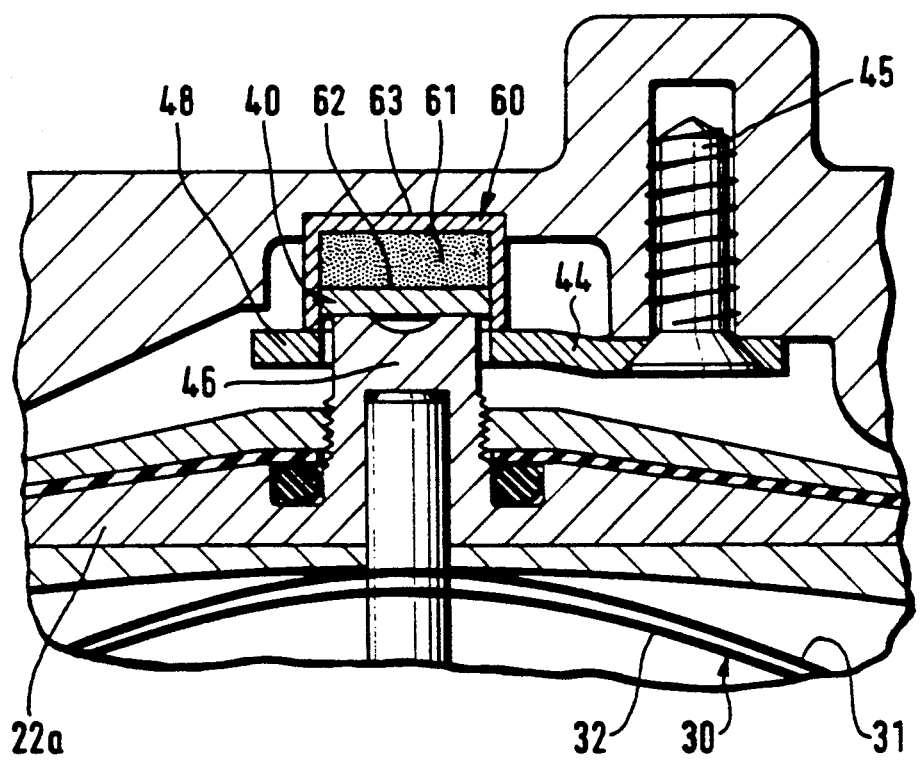

FIG. 4 shows the fuel injection pump equipped with such an expansion-material element 60 which is fixedly attached to the housing by a flange 44. The stop 40 is defined by a piston 62 of the element 60 and this piston 62 is displaced by the expansion of the material 61 in the housing 63. The expansion material 61 can be wax 61 for example.

It is understood that the foregoing description is that of the preferred embodiments of the invention and that various changes and modifications may be made thereto without departing from the spirit and scope of the invention as defined in the appended claims.

What is claimed is:

1. A fuel injection pump for a two-stroke engine, especially for handheld portable tools such as motor-driven saws or the like, the engine having a piston and a cylinder conjointly defining a combustion chamber and having a crankcase wherein pressure is developed in response to the movement of the piston, the fuel injection pump comprising:

a housing defining an enclosed work space;

a membrane partitioning said work space into a pulse chamber and a return chamber;

a spring mounted in said return chamber for applying a resilient biasing force to said membrane to bias said membrane into a rest position;

a pump chamber arranged in said housing;

fuel supply means connected to said pump chamber for supplying fuel to the latter;

fuel metering line means for conducting the fuel from said pump chamber to the engine;

a pump cylinder defining a longitudinal axis and communicating with said pump chamber;

a pump piston connected to said membrane and being slideably mounted in said cylinder so as to be reciprocally movable through a piston stroke along said axis away from a start position corresponding to said rest position of said membrane and back to said start position;

a connecting line connecting said pulse chamber to the crankcase for charging said pulse chamber with the pressure present in the crankcase for actuating said membrane to develop an actuating force against said biasing force of said spring for driving said pump piston into said pump chamber to pump the fuel therein through said fuel metering line means and for then charging said pulse chamber with an underpressure for withdrawing said pump piston away from said pump chamber to draw in a fresh quantity of fuel into said pump chamber from said fuel supply means;

stop means for determining said start position of said piston; and, displacing means for displacing said stop means along said axis in dependence upon temperature thereby adjusting the length of said stroke and the amount of fuel drawn into said pump chamber.

2. The fuel injection pump of claim 1, said stop means and said displacing means comprising: a bimetal strip having two ends and being mounted in said housing; and, clamping means for fixedly holding at least one of said ends in said housing.

3. The fuel injection pump of claim 2, said clamping means being adapted to fixedly hold said bimetal strip at both of said ends; and, said bimetal strip having a center segment and said bimetal strip being disposed in said housing so as to cause said center segment to define said stop.

4. The fuel injection pump of claim 3, said bimetal strip having a first position of said center segment corresponding to said start position; and, said bimetal strip being movable so as to cause said center segment to be displaceable in both directions along said axis so as to define an excursion of said center segment along said axis.

5. The fuel injection pump of claim 4, said stop means and said displacing means conjointly further comprising two counter stops disposed in said pump chamber along said axis for delimiting said excursion along both of said directions.

6. The fuel injection pump of claim 5, said bimetal strip having a predetermined length; and, said clamping means including: two supports formed on said housing; said elongated clamping member having a length extending over the length of said strip; and, fixing means for fixing said clamping member in said pump chamber so as to tightly clamp said bimetal strip against said supports; said clamping member having a window formed therein in the region of said center segment; and, said stop means and said displacing means further conjointly comprising a striker boss formed on said membrane plate for extending through said window and coacting with said center segment to define the length of said stroke.

7. The fuel injection pump of claim 6, said fixing means defining one of said counter stops for delimiting said excursions.

8. The fuel injection pump of claim 2, said bimetal strip being mounted in said pump chamber.

9. The fuel injection pump of claim 1, said spring being a leaf spring having foot ends and being arranged to extend diagonally across said return chamber beneath said membrane; two supports disposed in said return chamber for receiving said foot ends, respectively, to securely hold said leaf spring; and, a carrier mounted in said housing for securely holding said supports in said housing.

10. The fuel injection pump of claim 9, adjusting means for displacing at least one of said supports in the longitudinal direction of said leaf springs toward the other one of said supports.

11. The fuel injection pump of claim 1, said carrier being a frame and said adjusting means being a screw threadably engaged in said frame for displacing said one support relative to the other one of said supports.

12. The fuel injection pump of claim 1, said stop means and displacing means conjointly comprising an expansion element containing a material which expands in dependence upon temperature.

13. The fuel injection pump of claim 12, said expansion element including an element housing attached to said housing of said pump; an element piston movably mounted in said element housing for defining a stop for coacting with said membrane plate for determining said start position; and, an expansion material disposed in said housing for displacing said element piston in dependence upon temperature.

14. The fuel injection pump of claim 13, said expansion material being wax.

15. The fuel injection pump of claim 1, said stop means and said displacing means comprising: a memory metal strip having two ends and being mounted in said housing; and, clamping means for fixedly holding at least one of said ends in said housing.

16. The fuel injection pump of claim 15, said clamping means being adapted to fixedly hold said memory metal strip at both of said ends; and, said memory metal strip having a center segment and said memory metal strip being disposed in said housing so as to cause said center segment to define said stop.

17. The fuel injection pump of claim 16, said memory metal strip having a first position of said center segment corresponding to said start position; and, said memory metal strip being movable so as to cause said center segment to be displaceable in both directions along said axis so as to define an excursion of said center segment along said axis.

18. The fuel injection pump of claim 17, said stop means and said displacing means conjointly further comprising two counter stops disposed in said pump chamber along said axis for delimiting said excursion along both of said directions.

19. The fuel injection pump of claim 18, said memory metal strip having a predetermined length; and, said clamping means including: two supports formed on said housing; said elongated clamping member having a length extending over the length of said strip; and, fixing means for fixing said clamping member in said pump chamber so as to tightly clamp said memory metal strip against said supports; said clamping member having a window formed therein in the region of said center segment; and, said stop means and said displacing means further conjointly comprising a striker boss formed on said membrane plate for extending through said window and coacting with said center segment to define the length of said stroke.

20. The fuel injection pump of claim 19, said fixing mans defining one of said counter stops for delimiting said excursions.

21. The fuel injection pump of claim 15, said memory metal strip being mounted in said pump chamber.

* * * * *

UNITED STATES PATENT AND TRADEMARK OFFICE
CERTIFICATE OF CORRECTION

PATENT NO.   :   5,197,418

DATED        :   March 30, 1993

INVENTOR(S)  :   Michael Wissmann, Hans Nickel, Ralf Tuckermann
                 and Werner Geyer It is certified that error appears in the above-identified patent and that said Letters Patent is hereby corrected as shown below:

In column 4, line 34: between "the" and "movement", insert -- upward --.

Signed and Sealed this

Thirtieth Day of November, 1993

Attest:

BRUCE LEHMAN

Attesting Officer

Commissioner of Patents and Trademarks